Patented May 22, 1923.

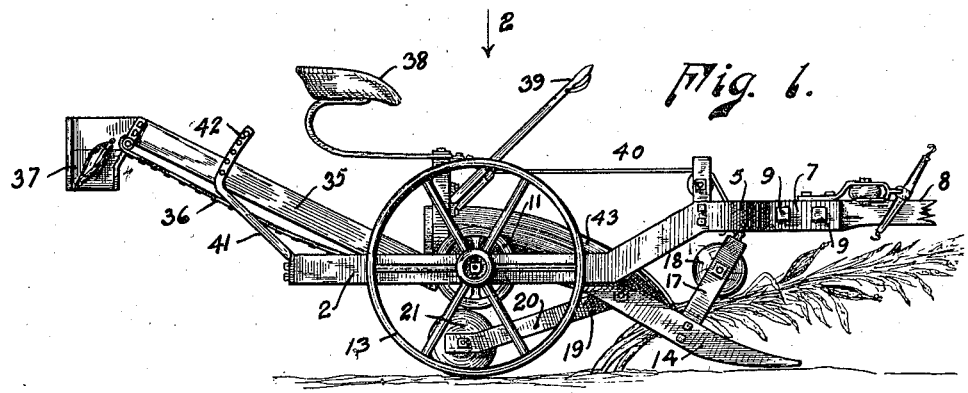
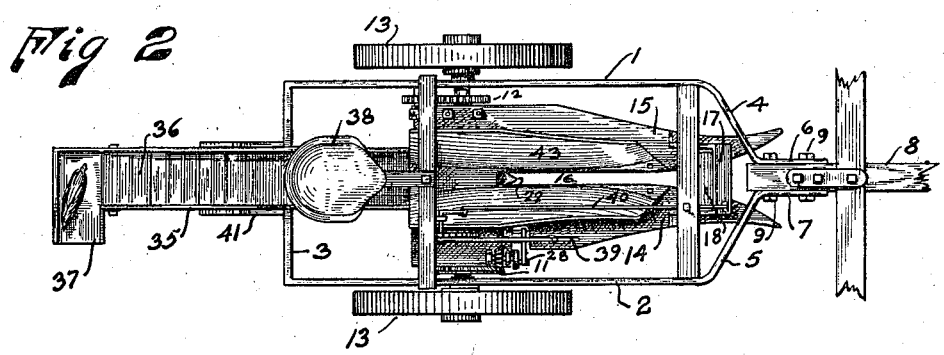
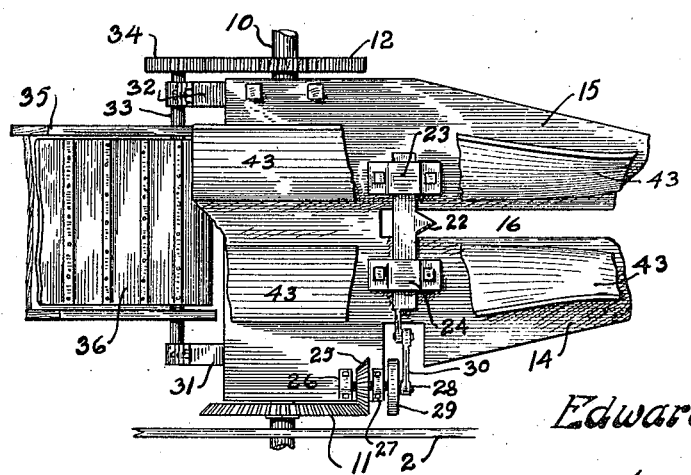

1,456,012

UNITED STATES PATENT OFFICE.

EDWARD SAUNDERS, OF DENVER, COLORADO, ASSIGNOR OF FORTY-NINE ONE-HUNDREDTHS TO HARRY BUXTON, OF DENVER, COLORADO.

CORN-SNAPPING MACHINE.

Application filed May 4, 1922. Serial No. 558,457.

*To all whom it may concern:*

Be it known that I, EDWARD SAUNDERS, a citizen of the United States, residing at 4733 Clay Street, in the city and county of Denver and State of Colorado, have invented certain new and useful Improvements in Corn-Snapping Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a machine designed for the purpose of snapping corn.

It is the object of this invention to produce a machine that will "snap" the ears of corn from the stalk while the latter is still in the field, and to elevate the ears thus removed into the box of a wagon. The corn thus "snapped" can then be stored or fed directly to the stock.

It is a further object of this invention to produce a simple machine that can be readily made and assembled and which can therefore be sold at a moderate price.

In order to more clearly describe my invention, I shall have reference to the accompanying drawing, in which—

Fig. 1 is a side elevation of my machine;

Fig. 2 is a top plan view thereof; and

Fig. 3 is a fragmentary top plan view with parts broken away to better illustrate the same.

The same reference numerals will be used to designate the same parts throughout the several views.

A framework consisting of a piece of suitable soft steel is bent into the form of a rectangle with sides 1 and 2, a rear end 3, and a front portion consisting of sides 4 and 5 having forwardly projecting ends 6 and 7 which are adapted to be clamped to the sides of tongue 8 by means of bolts 9. The frame described above is mounted on an axle 10, to which is secured a beveled gear 11 and a spur gear 12, the whole being, of course, mounted on suitable wheels 13. A pair of substantially parallel members 14 and 15 have their rear ends pivotally connected to the axle 10 and have their forwardly projecting ends downwardly and outwardly curved, as shown in Figs. 1 and 2. The front ends of members 14 and 15 are intended to straddle a row of corn in the manner shown in Fig. 1 and to direct the stalks into the slot 16 between the inner sides of the same. Secured to members 14 and 15 near the forward ends thereof is a U-shaped member 17 which supports a roller 18 in the manner shown in Fig. 1. Pivotally secured to the under side of members 14 and 15 are two bars 19 and 20, to the rear end of which is rotatably secured a roller 21. Near the rear end of slot 16 I mount a sickle 22 whose ends are slidably mounted in guides 23 and 24. For the purpose of reciprocating said sickle I provide a bevel gear pinion 25 that meshes with the gear 11. Pinion 25 is mounted on a shaft which rotates in the bearings 26 and 27. The front end of said shaft has a crank disc 29 secured thereto and provided with a crank pin 28. A pitman 30 connects crank pin 29 with the end of sickle 22 and reciprocates the latter as the machine moves forwardly.

Secured to the rear part of the machine are two brackets 31 and 32 (Fig. 3) in which is rotatably mounted a shaft 33 carrying on one end a pinion 34 which meshes with gear 12. An elevator 35 has its lower end pivotally attached to shaft 33 and is provided with a conveyor apron or belt 36. As the machine is moved in a forward direction the shaft 33 is rotated, and this in turn imparts an upward movement to the top side of the conveyor belt whereby the latter will elevate the ears of corn and deposit them on the chute 37 from which they slide into the box of the wagon (not shown). A seat 38 is provided for the operator and within easy reach is a lever 39 which is connected, by suitable means such as a cable 40, with the upper end of U-shaped member 17. By means of lever 39 the operator may raise or lower the forward ends of members 14 and 15 in a manner perfectly apparent. The elevator is supported by braces 41 which are provided with holes 42 for adjusting the elevator. Upwardly inclined flanges 43 are provided on each side of slot 16 for the purpose of guiding the ears toward the sickle 22.

The operation of my machine is as follows: A team of horses are hitched to the tongue in the usual way. One horse is made to travel on one side of the row and the other horse on the other side; this brings the tongue directly over the corn row. The points of members 14 and 15 straddle the row, as shown in Fig. 1, and the roller 18 helps to bend the stalks over. When the ears come in contact with the upper surfaces of members 14 and 15, they slide rearwardly along the same until they reach the sickle when they are cut loose from the stalk and are deposited on the elevator by which they are transferred into the box of the wagon which follows the machine for this purpose.

It is apparent from the above that I have devised a simple machine that is well adapted to "snap" ears of corn from the stalks and elevate the same into a wagon. My machine is of very simple construction and can be cheaply made and assembled.

I am aware that minor changes in construction can be made without departing from the spirit of the invention, and I reserve the right to make such alterations as fall within the scope of the appended claims.

Having now described my invention, what I claim is—

1. A corn snapping machine, comprising a framework, an axle, and a pair of wheels upon which said framework is supported, a pair of forwardly and downwardly projecting members spaced to form a slot between them, and having their rear ends pivotally mounted on said axle, said members adapted to straddle a row of corn stalks, a sickle near the rear end of said slot, said sickle being adapted to sever an ear of corn from the stalk, means for moving said sickle, an elevator, means for operating said elevator, a roller carried by the forward ends of said members, and means for adjusting the height of the front ends thereof.

2. A corn snapping machine, comprising a framework, an axle, and a pair of wheels upon which said framework is supported, a pair of forwardly and downwardly projecting members spaced to form a slot between them, and having their rear ends pivotally mounted on said axle, said members adapted to straddle a row of corn stalks, a sickle near the rear end of said slot, said sickle being adapted to sever an ear of corn from the stalk, means for moving said sickle, an elevator, means for operating said elevator, a roller carried by the forward ends of said members, a roller secured to the under surface of the said members adapted to bend the stalks, and means for adjusting the forwardly projecting member.

3. A corn snapping machine, comprising a framework, an axle, and a pair of wheels upon which said framework is supported, a pair of forwardly and downwardly projecting members spaced to form a slot between them, and having their rear ends pivotally mounted on said axle, said members adapted to straddle a row of corn stalks, a sickle near the rear end of said slot, said sickle being adapted to sever an ear of corn from the stalk, means for moving said sickle, an elevator, means for operating said elevator, a roller carried by the forward ends of said members, a roller secured to the under surface of the said members adapted to bend the stalks, means for adjusting the forwardly projecting member, and means for adjusting the height of the elevator.

In testimony whereof I affix my signature.

EDWARD SAUNDERS.